(12) United States Patent
Whiteside

(10) Patent No.: US 9,829,118 B2
(45) Date of Patent: Nov. 28, 2017

(54) CABLE GUIDE

(71) Applicant: NCR Corporation, Duluth, GA (US)

(72) Inventor: William Brian Whiteside, Ball Park, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/813,802

(22) Filed: Jul. 30, 2015

(65) Prior Publication Data

US 2017/0030485 A1    Feb. 2, 2017

(51) Int. Cl.
| | |
|---|---|
| G07G 1/00 | (2006.01) |
| F16L 3/015 | (2006.01) |
| A47F 9/04 | (2006.01) |
| G06Q 20/20 | (2012.01) |
| F16L 3/26 | (2006.01) |
| G06Q 20/18 | (2012.01) |
| G07G 1/12 | (2006.01) |
| H05K 7/14 | (2006.01) |
| H02G 11/00 | (2006.01) |

(52) U.S. Cl.
CPC ............... F16L 3/015 (2013.01); A47F 9/04 (2013.01); F16L 3/26 (2013.01); G06Q 20/18 (2013.01); G06Q 20/20 (2013.01); G07G 1/12 (2013.01); H02G 11/003 (2013.01); H05K 7/14 (2013.01); *A47F 9/046* (2013.01)

(58) Field of Classification Search
CPC ..... G02B 6/4432; G02B 6/449; F01N 13/185; H02G 7/053; H02G 7/10
USPC ........... 385/54, 55, 100, 104; 248/49, 60, 63
See application file for complete search history.

(56) References Cited

U.S. PATENT DOCUMENTS

| | | | | |
|---|---|---|---|---|
| 2,997,521 A | * | 8/1961 | Dahlgren | H05K 3/0061 156/292 |
| 5,078,466 A | * | 1/1992 | MacCulloch | G02B 6/3604 385/26 |
| 6,286,758 B1 | | 9/2001 | Dejaeger et al. | |
| 6,819,954 B2 | * | 11/2004 | Connelly | A61N 1/056 607/27 |
| 7,621,446 B2 | | 11/2009 | Addison et al. | |
| 7,627,218 B2 | * | 12/2009 | Hurley | G02B 6/4457 385/100 |
| 8,925,811 B2 | | 1/2015 | Collins, Jr. et al. | |
| 9,155,406 B1 | | 10/2015 | Whiteside et al. | |
| 9,275,382 B2 | | 3/2016 | Dubois et al. | |
| 2007/0036506 A1 | * | 2/2007 | Kewitsch | G02B 6/4457 385/135 |
| 2008/0314597 A1 | * | 12/2008 | Sbordone | E21B 17/015 166/335 |

FOREIGN PATENT DOCUMENTS

| | | |
|---|---|---|
| WO | WO/2011/086198 | 7/2011 |
| WO | WO/2013/156605 | 10/2013 |

* cited by examiner

*Primary Examiner* — Daniel St Cyr
(74) *Attorney, Agent, or Firm* — Schwegman, Lundberg & Woessner

(57) ABSTRACT

A cable guide may include a flexible member. The flexible member may have a first endpoint and a second endpoint. The flexible member may be curved about a central point. When in a first state the flexible member may have a radius of curvature that continuously decreases towards the second endpoint.

12 Claims, 13 Drawing Sheets

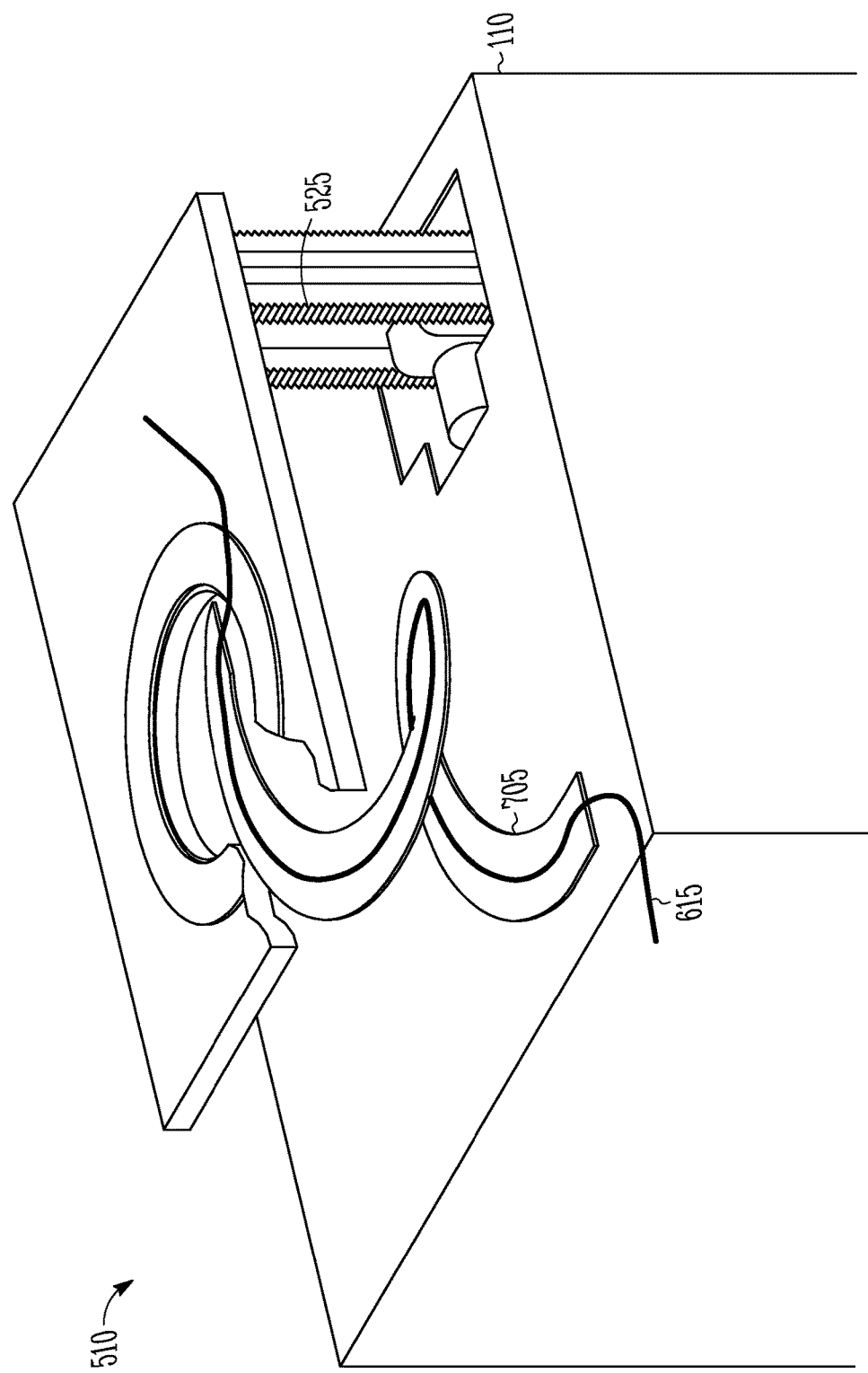

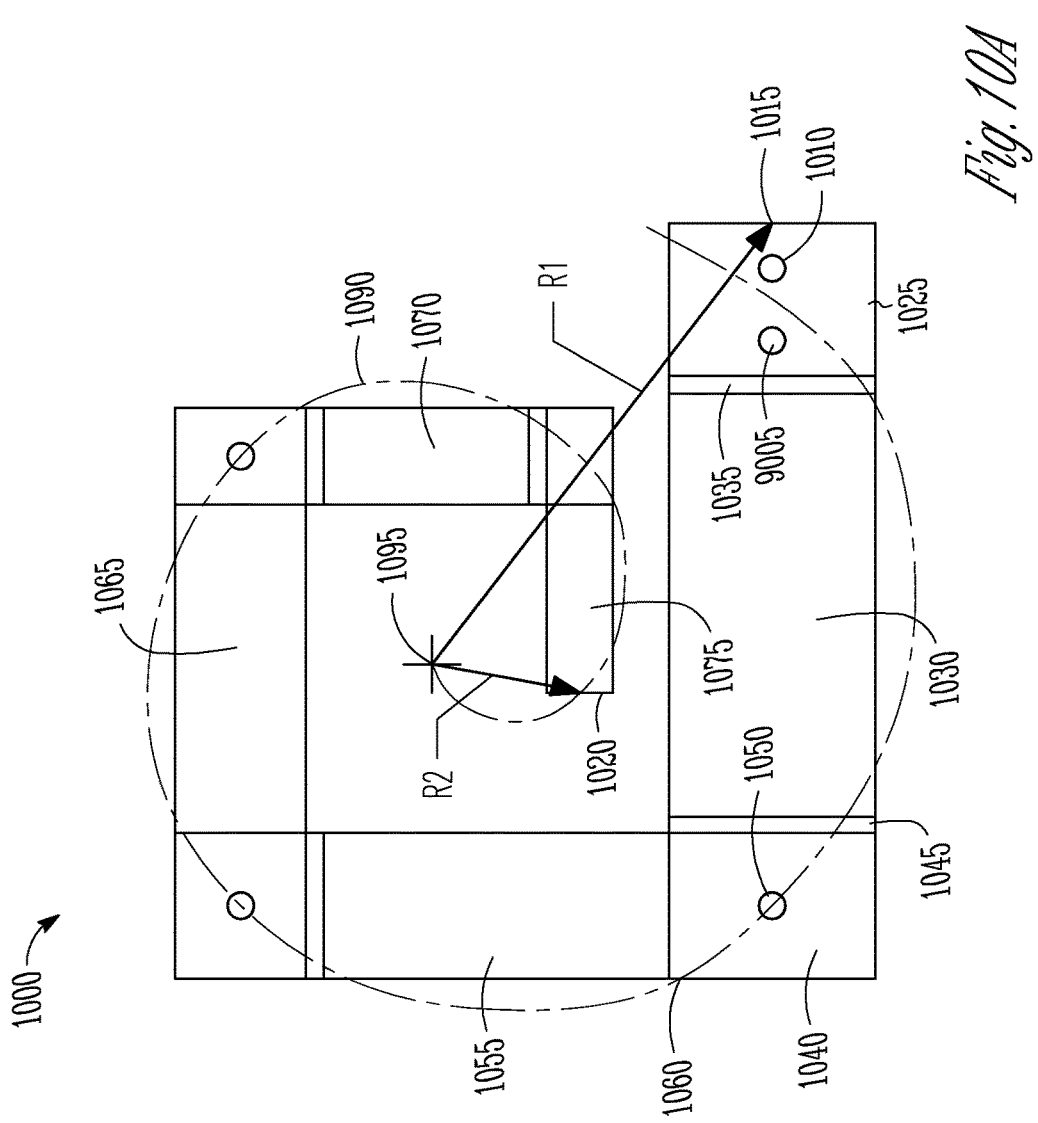
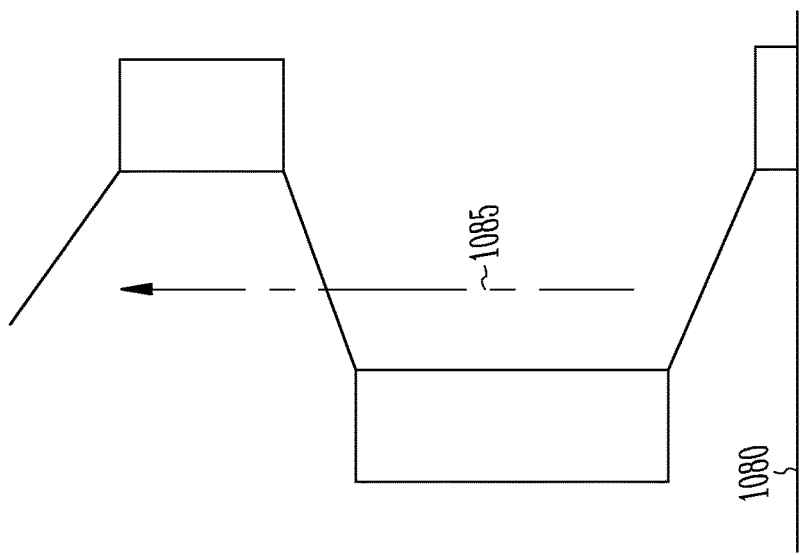

CABLE GUIDE

CROSS-REFERENCE TO RELATED APPLICATIONS

This application is related to U.S. patent application Ser. No. 14/633,968 entitled Conversion Lifting Platform, filed on Feb. 27, 2015, which is incorporated by reference in its entirety.

BACKGROUND

Self-service terminals have become ubiquitous within the retail and banking environments. At the retail level, self-service terminals reduce labor requirements and increase check-out efficiency by allowing one cashier to oversee four check-out lanes. Within the financial services sector, self-service terminals, or automated teller machines, allow banking and other financial customers to make withdrawals and deposits or perform other financial transactions without having to find time to visit a financial institution during banker's hours or even visit a financial institution.

SUMMARY

A cable guide may include a flexible member. The flexible member may have a first endpoint and a second endpoint. The flexible member may be curved about a central point. When in a first state the flexible member may have a radius of curvature that continuously decreases towards the second endpoint. The flexible member having a flat portion extending from the first endpoint to the second endpoint. The flat portion for attaching a cable thereto.

BRIEF DESCRIPTION OF THE FIGURES

The above-mentioned and other features and advantages disclosed herein, and the manner of attaining them, will become more apparent and the disclosure itself will be better understood by reference to the following description of embodiments taken in conjunction with the accompanying drawings, wherein:

FIG. 7 shows a cable guide connected to a housing according to an example embodiment;

FIGS. 10A and 10B show a top view and a side view of a cable guide consistent with embodiments disclosed herein.

Corresponding reference characters indicate corresponding parts throughout the several views. The exemplifications set out herein illustrate embodiments, and such examples are not to be construed as limiting the scope of the appended claims any manner.

DETAILED DESCRIPTION

Figure 1:
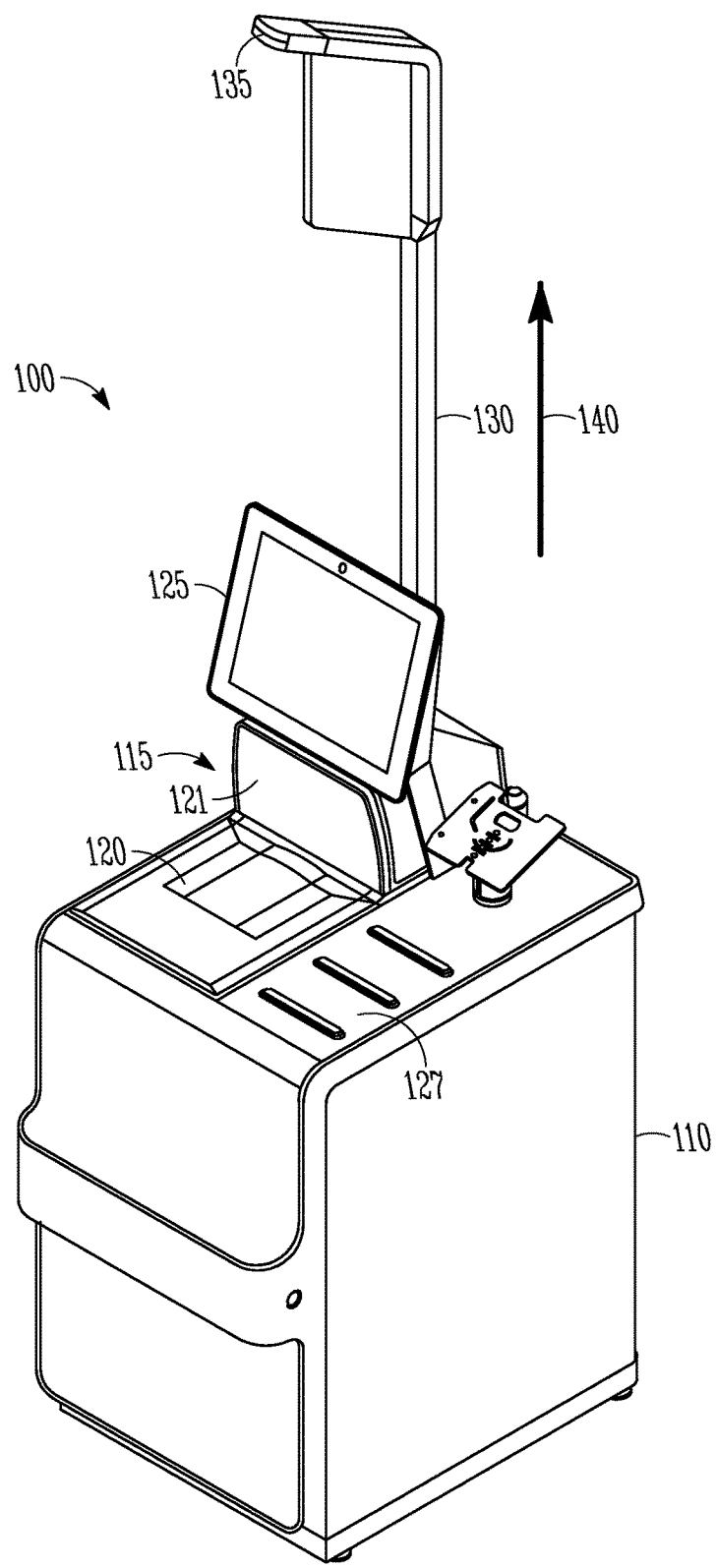
FIG. 1 shows a perspective view of a system incorporating a conversion lifting platform according to an example embodiment.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the discloses systems. Accordingly, the following detailed description does not limit the disclosure. Instead, the proper scope of any invention disclosed herein is defined by the appended claims.

FIG. 1 is a block perspective diagram of a system 100 that includes a housing 110 supporting a checkout module indicated generally at 115. Housing 110 may have a rack like structure and may contain circuitry to provide power, processing, card reading, and other functions. In various embodiments, checkout module 115 may include a product identifier, such as, but not limited to, RF readers or barcode scanners 120, 121, and a display 125, which may be a touchscreen display that may accept user input. Scanner 120, as shown, may be parallel to a working surface 127 of housing 110 and may to facilitate scanning of products to be purchased. Working surface 127 may also be referred to as a top surface. Checkout module 115 may also include a card reader that may be used to complete transactions. A marker device 130 may be used to provide indicators to customers, such as via a light 135 having a color representative of a status of a lane that system 100 is servicing.

System 100 may be used in two different modes. One mode may include a customer self-service mode where the customer scans products the customer is purchasing. A second mode may include an assisted mode where a cashier scans the customer's products and performs other checkout functions. The cashier or other merchant personnel may change the modes. For example, the may be changed by lifting checkout module 115 as indicated by arrow 140, and rotating it 180 degrees such that scanners 120, 121, and display 125 are facing opposite the position as described herein. Such a change may enable the flow of customer traffic to remain the same in both modes, but facilitates changing the party handling the scanning. Generally, cashiers may be more proficient at scanning products because they may have practiced doing so many more hours than an average customer. Changing the mode of operation thus may provide a store the option of configuring systems in either mode to facilitate efficient customer flow and reduce bottlenecks, which may be caused by customer self-checkout during busy periods.

Checkout module 115 may weigh more than may be conveniently lifted by cashiers and other store personnel. For example checkout module 115 may weigh nearly 40 kg (approximately 88 lbs.).

Figure 2:
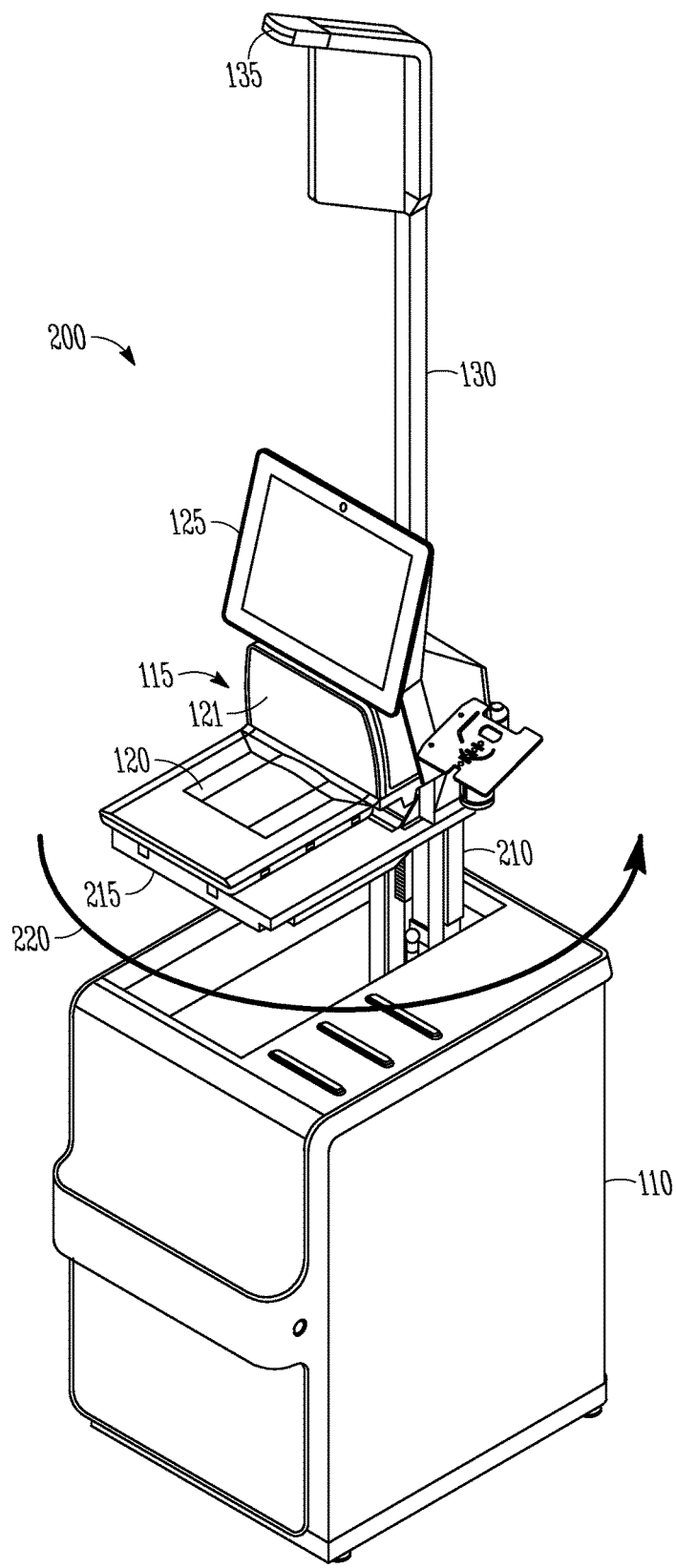
FIG. 2 shows a perspective view of the system of FIG. 1 illustrating a module lifted above a top surface according to an example embodiment.

FIG. 2 is a block perspective diagram of system 100 illustrating checkout module 115 having been elevated above top surface 127 of housing 110 as indicating generally at 200. The lift travel may be about (180 mm (approximately 7 in.) in one embodiment, but may vary depending on the size of check module 115 to be reconfigured. A lifting arm 210 may be coupled to a rotatable platform 215. Once checkout module 115 is lifted, platform 215 may support checkout module 115 above surface 127 of housing 110 and may allow rotation as indicated by arrow 220.

Figure 3:
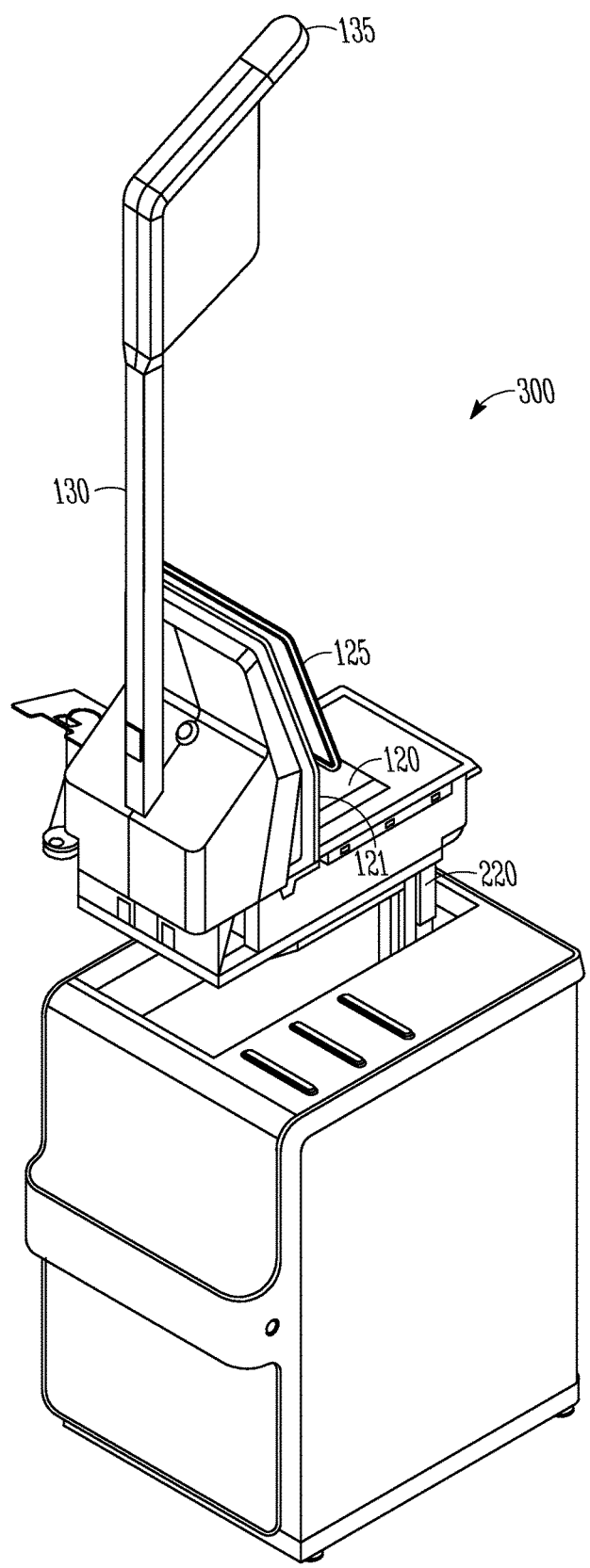
FIG. 3 shows a perspective view of the system of FIG. 1 illustrating a module lifted above a top surface and rotated according to an example embodiment.
Figure 4:
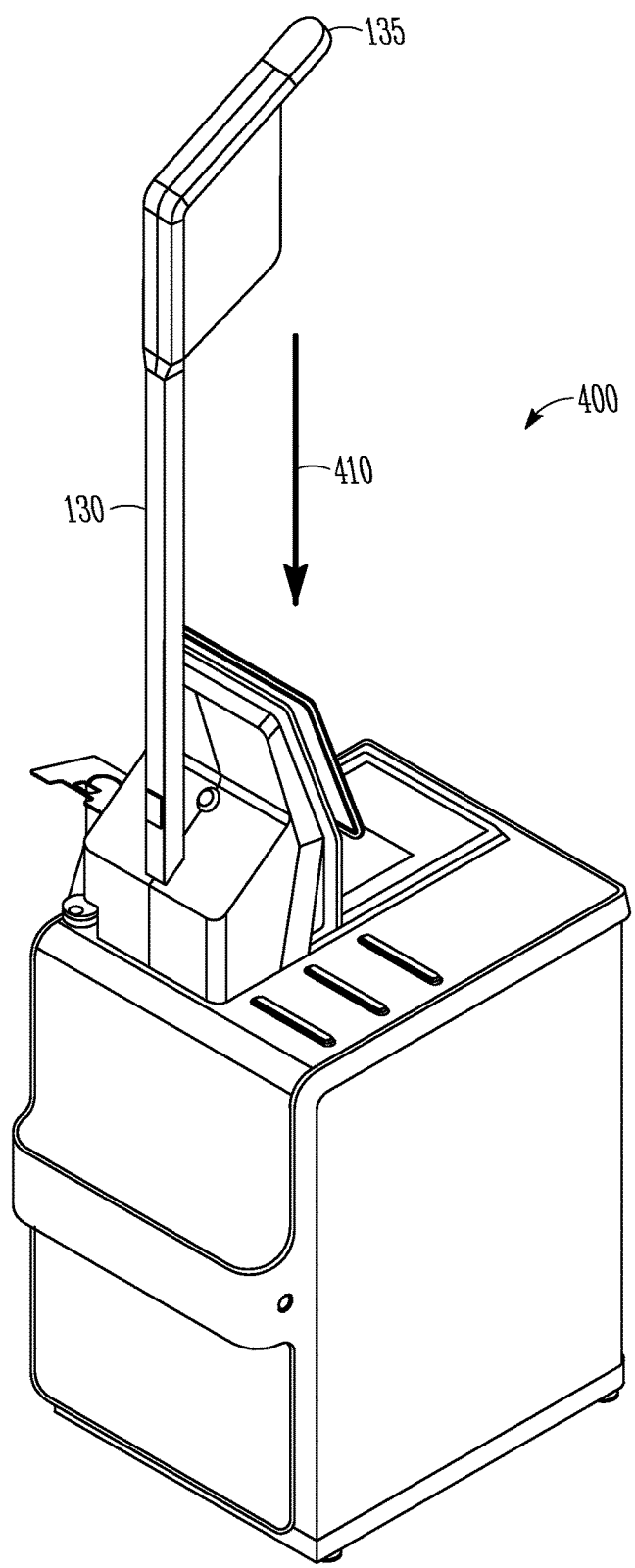
FIG. 4 shows a perspective view of the system of FIG. 1 illustrating a module in a converted position according to an example embodiment.

Once rotated, checkout module 115 may be in a position indicated as 300 in FIG. 3. As shown in FIG. 3, checkout module 115 may be facing 180 degrees from the original position shown in FIG. 1. Once platform 215 has been rotated, lifting arm 210 may then be used to lower checkout module 115 back to a position such that scanner 120 is again flush with the top surface 127 of housing 110 as illustrated at 400 in FIG. 4. An arrow 410 shows the direction corresponding to lowering checkout module 115. FIGS. 1 and 4 thus show system 100 in two different modes of operation, a customer self-checkout mode indicated in FIG. 1 and in a customer assisted mode indicated in FIG. 4. In some embodiments, the direction of checkout module 115 combined with designed customer traffic patterns in a store may define which mode system 100 is in.

Figure 5:
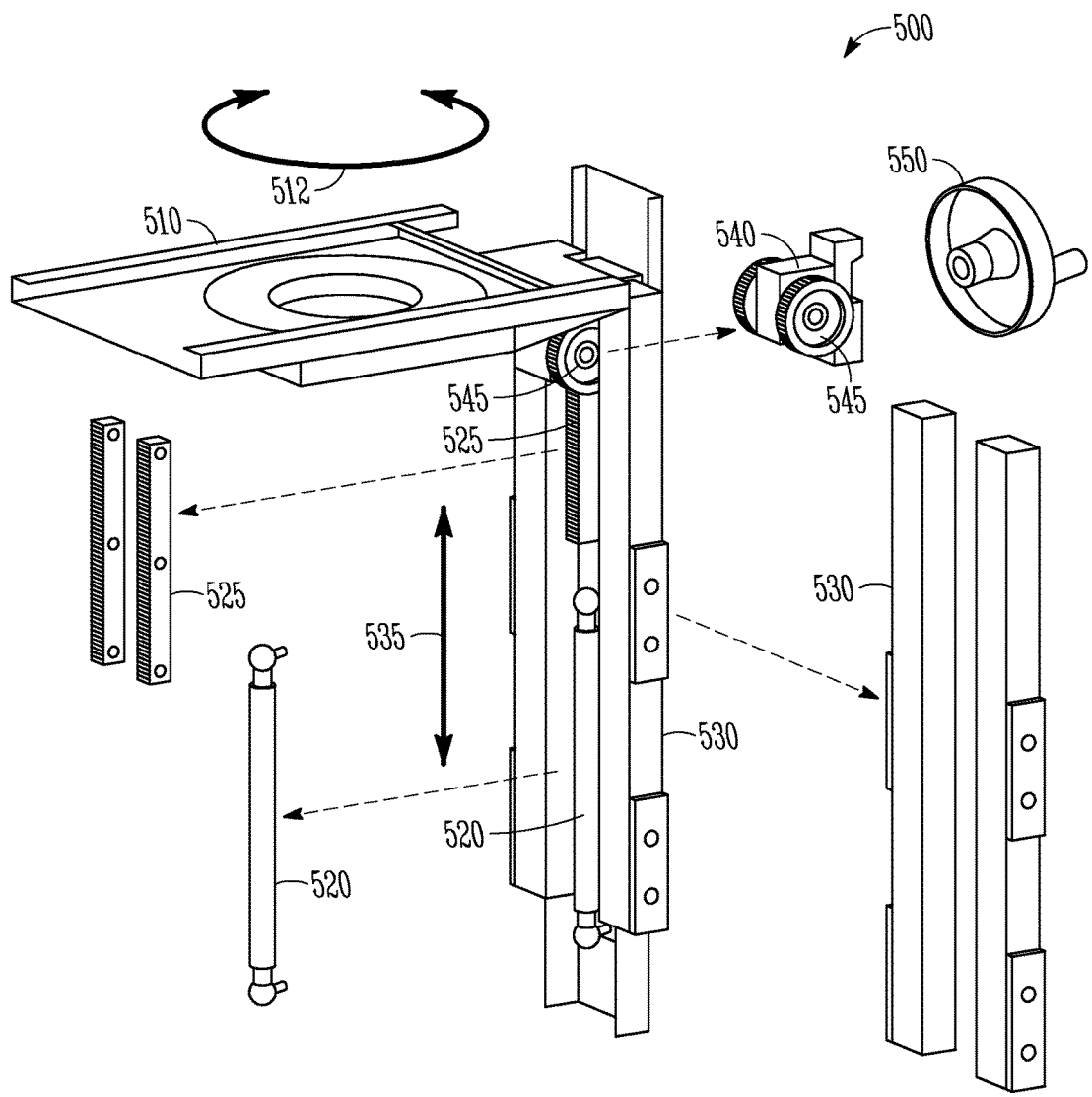
FIG. 5 is an exploded perspective of a lift assembly according to an example embodiment.

FIG. 5 is an exploded perspective of a lift assembly 500. FIG. 5 shows lift assembly 500 fully assembled, as well as selected parts in duplicated and separately illustrated to more clearly illustrate lift assembly 500.

Consistent with embodiments, lift assembly 500 may include a rotatable platform 510. Lift assembly 500 may be supported by housing 110 (as shown in FIG. 2) and coupled to lift rotatable platform 510 above housing 110. Rotatable platform 510 may support checkout module 115 (as shown in FIGS. 1-4) and rotate checkout module 115 between a self-checkout position and an assisted checkout position as illustrated by arrow 512. Bearings and lubricants may be used to allow for smooth rotation of rotatable platform 510.

Consistent with embodiments, lift assembly 500 may include a spring 520 that may act as a counter balance and may aid in lifting rotatable platform 510. Spring 520 may be a gas spring, such as one rated at 75 lbs. in an embodiment, corresponding to slightly less than the weight of checkout module 115 and lift assembly 500 combined.

Lift assembly 500 may also include at least one gear rack 525 (two shown) coupled to an upright support arm 530. Upright support arm 530 may include C-shaped rails with crown rollers mounted in linear rail slide blocks to provide a telescoping mount for rotatable platform 510 that is driven up and down by gear racks 525. The direction of telescoping is illustrated by arrow 535.

A worm drive 540 may be supported by housing 110 may have one or more spur gears 545 to mesh with gear rack 525. Rotation of worm drive 540, such as by a user utilizing a hand crank 550 coupled to worm drive 540 may be used to move rotatable platform 510 up and down. In addition, a motor may be used instead of or in conjunction with had crank 550 to raise and lower rotatable platform 510. A button or other switches located within housing 110 may control the motor.

Figure 6:
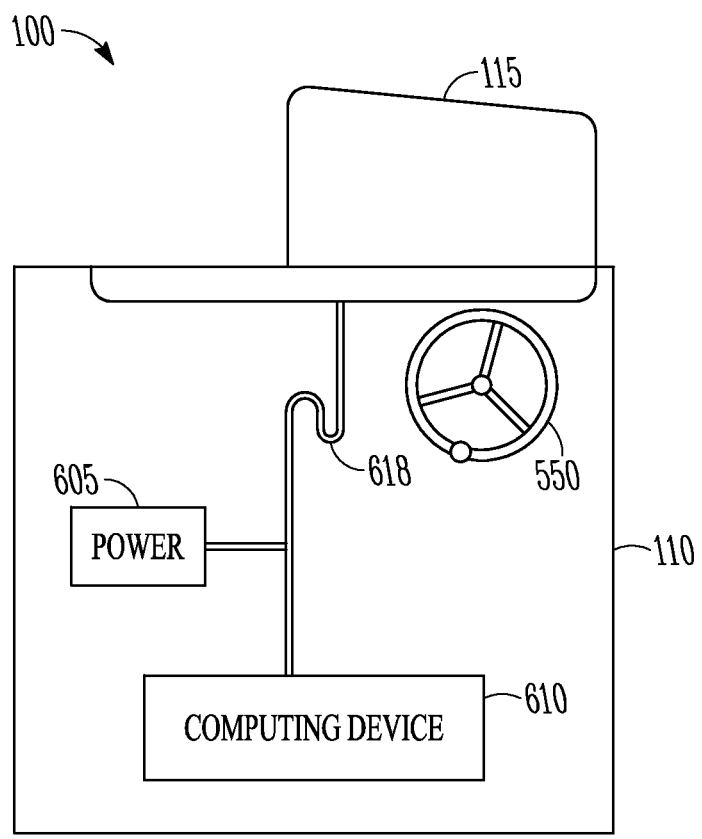
FIG. 6 is a block representation of a system incorporating a conversion lifting platform according to an example embodiment.

FIG. 6 is a block representation of system 100. System 100 may include housing 110, which may include various electronics 605 that may be connected to a power supply 610. Electronics 605 and power supply 610 may be connected to checkout module 115 via an electrical cable 615. As shown in FIG. 7, a cable guide 705 may support electrical cable 615. Cable guide 705 may be coupled to housing 110. Electrical cable 615 may contain sufficient slack to allow lifting and rotation of checkout module 115 between the self-checkout position and the assisted checkout position.

Figure 8A:
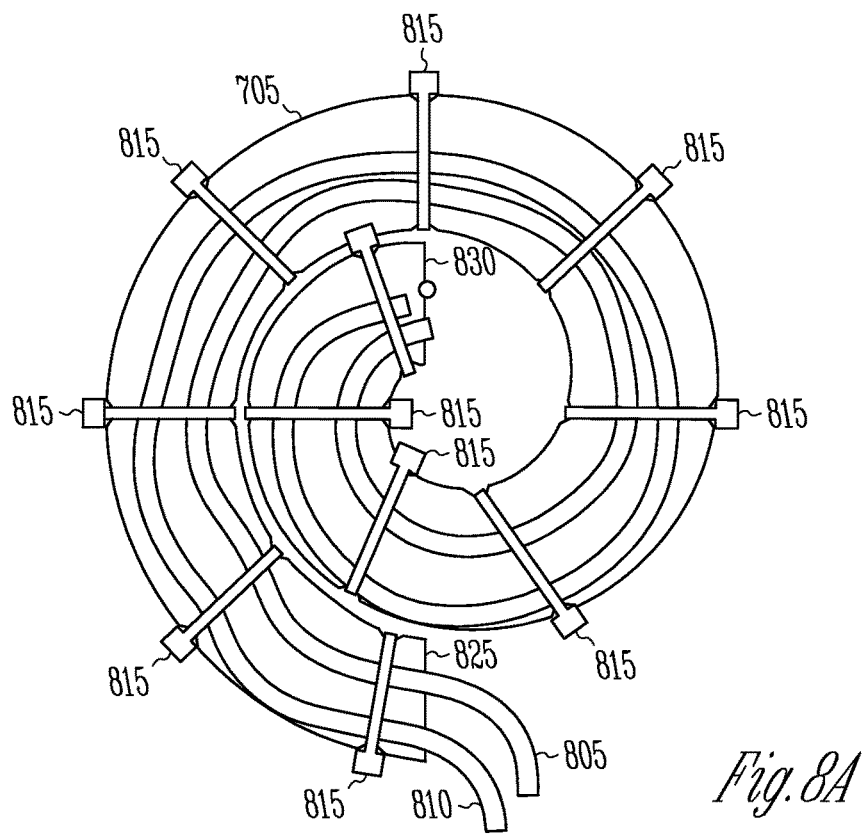
FIGS. 8A, 8B, and 8C show a top view, a perspective view of a cable guide in a collapsed state, and a perspective view of a cable guide in an expanded state, respectively, consistent with embodiments disclosed herein.
Figure 8B:
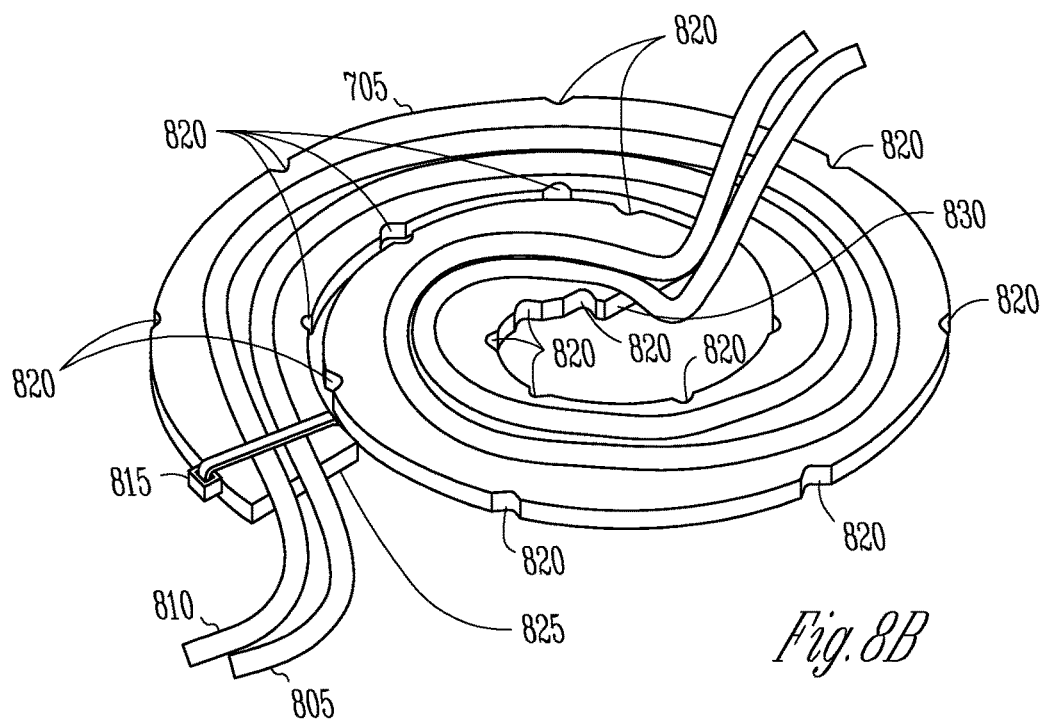
Figure 8C:
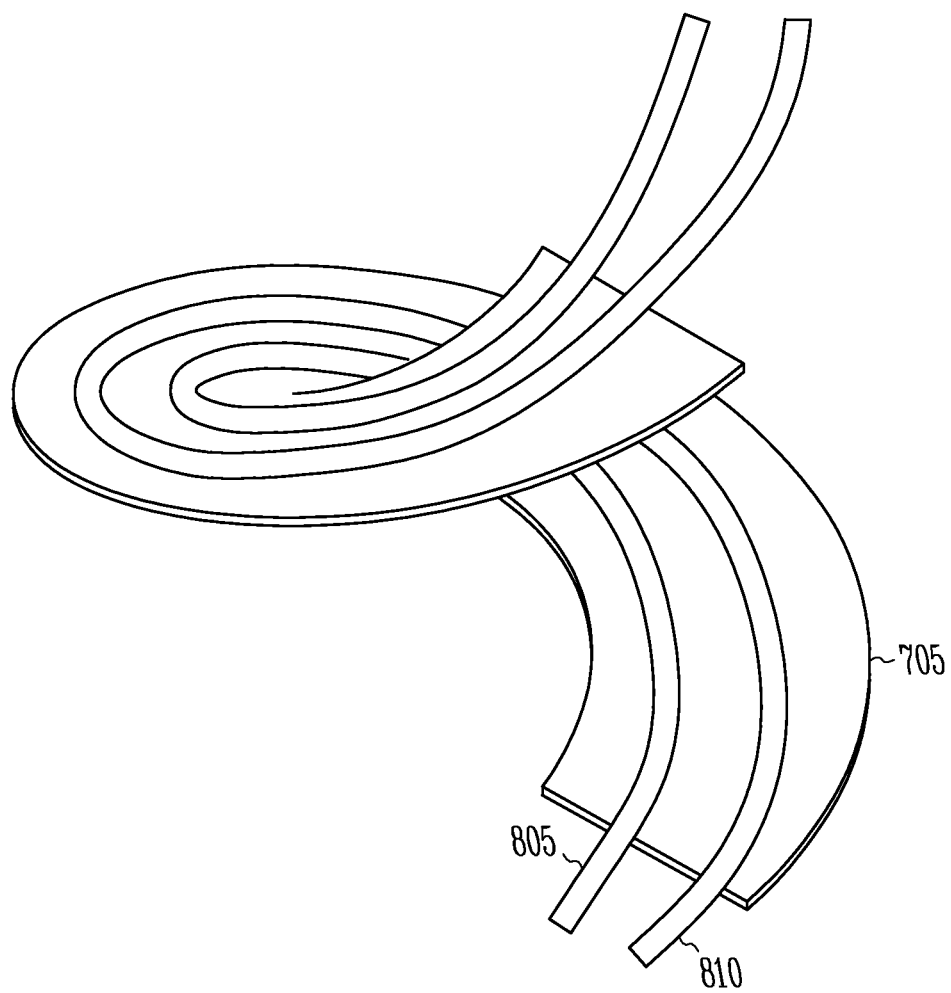

FIGS. 8A, 8B, and 8C show a top view, a perspective view of cable guide 705 in a collapsed position, and a perspective view of cable guide 705 in an expanded state, respectively, consistent with embodiments disclosed herein. As shown in FIGS. 8A, 8B, and 8C, a first cable 805 and a second cable 810 may be coupled to cable guide 705. First cable 805 and second cable 810 may be coupled to cable guide 705 with a plurality of cable ties 815. The number of cable ties 815 may vary depending on an application. For instance, as shown in FIG. 8B a single cable tie 815 may be used and as shown in FIG. 8C no cable tie may be used. Also, as shown in FIG. 8B, cable guide 705 may include a plurality of notches 820. The plurality of notches 820 may be sized to receive cable ties 815.

As shown in FIGS. 8A and 8B, when cable guide 705 is in a first state (e.g., collapsed), a first endpoint 825 and a second endpoint 830 may be coplanar. The flexible member that make ups cable guide 705 may have a flat portion extending from first endpoint 825 to second endpoint 830. As shown in FIGS. 7 and 8C, when cable guide 705 is in a second state, first endpoint 825 and second endpoint 830 may be non-coplanar. Stated another way, when cable guide 705 is in the first state cable guide 705 may be flat and when cable guide 705 is in the second state cable guide 705 may extend and may form a helix.

Figure 9A:
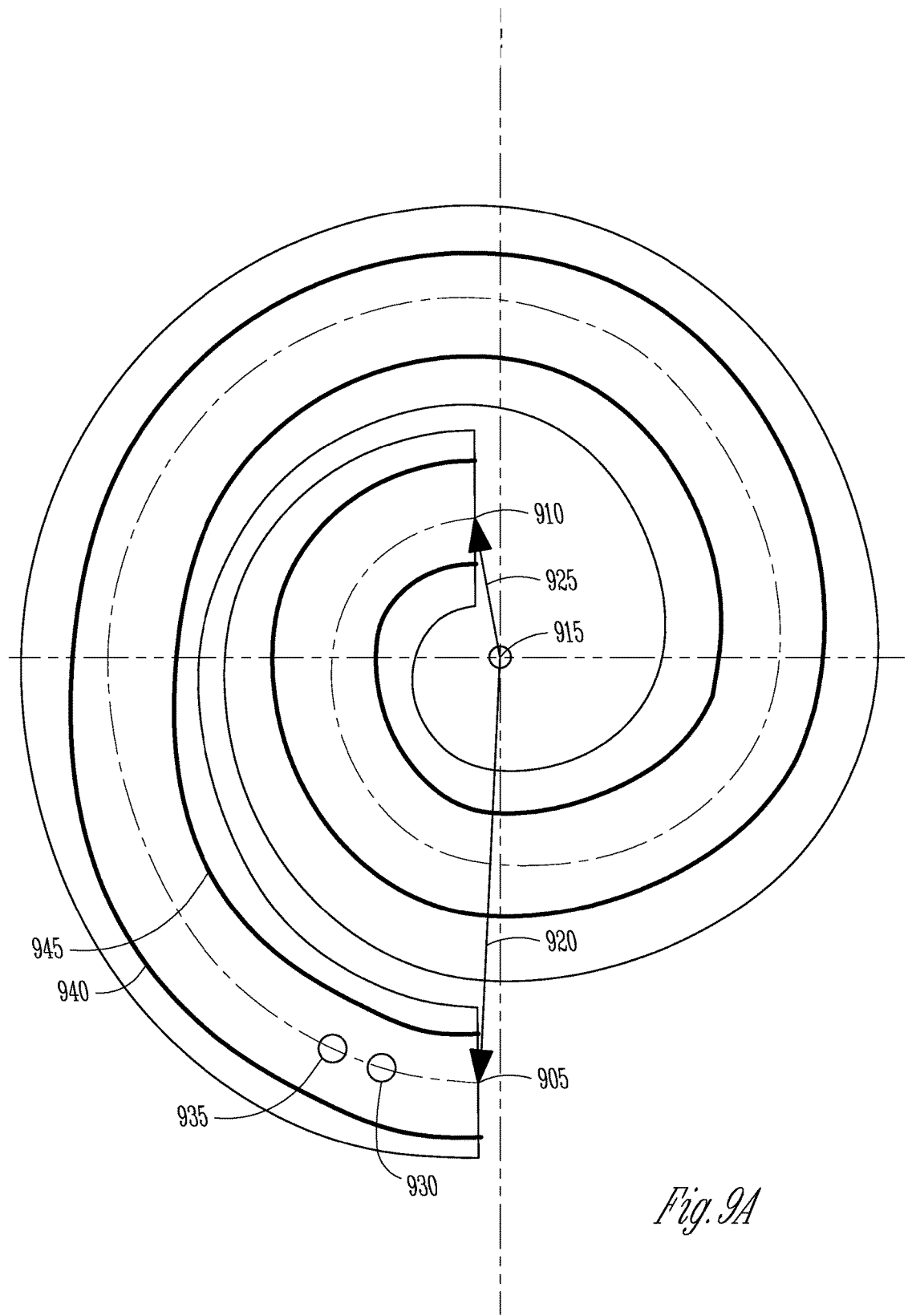
FIGS. 9A and 9B show a top view of a cable guide consistent with embodiments disclosed herein.
Figure 9B:
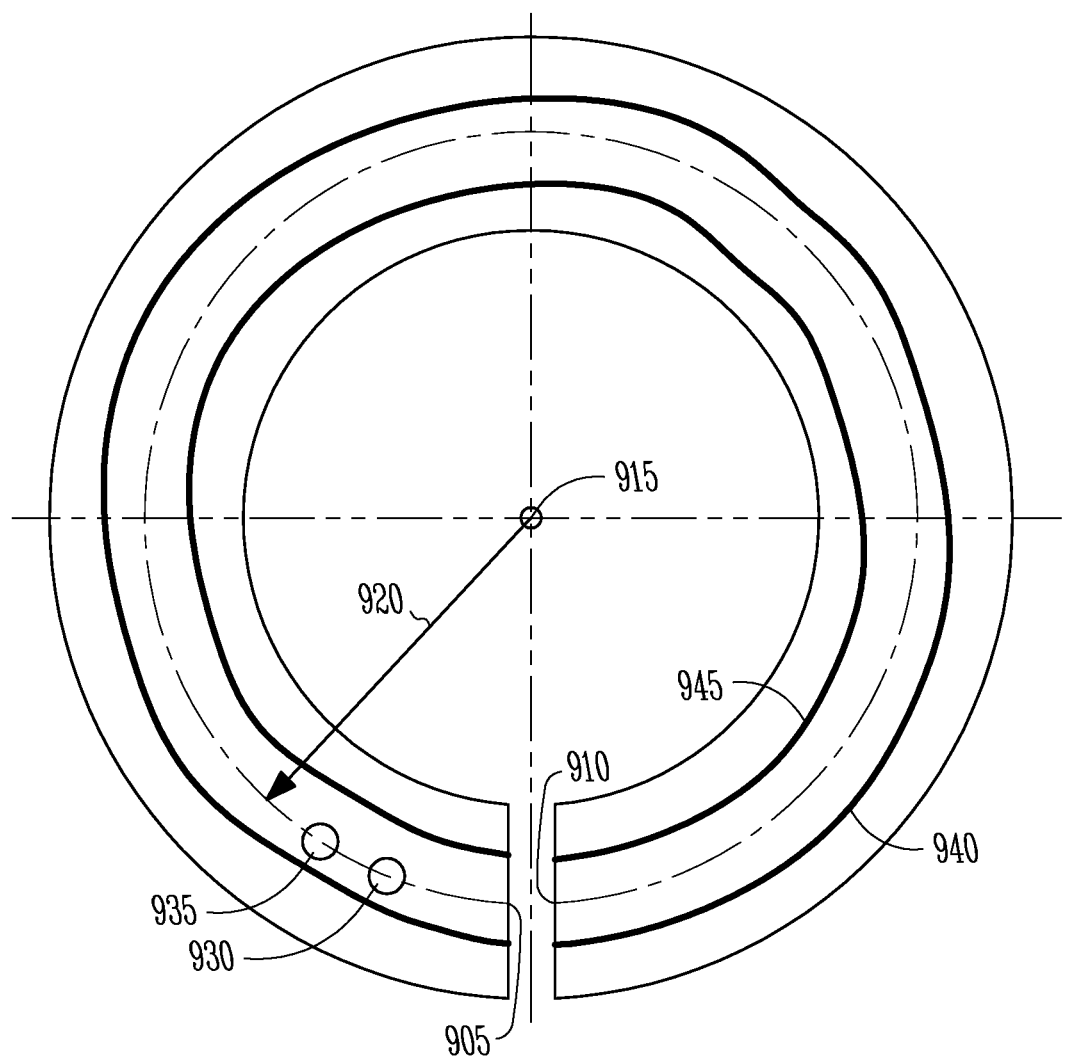

FIGS. 9A and 9B show a top view of cable guide 705. FIG. 9A shows cable guide 705 in a first state. As shown in FIG. 9a, cable guide 705 may have a first endpoint 905 and a second endpoint 910. Cable guide 705 may be constructed of a flexible member. For example, cable guide 705 may be constructed of a low density polymer (e.g., a grade 15803-020 low density polyethylene), a flexible metal (e.g., a stainless steel sheetmetal), etc. Cable guide 705 may also include a first through-hole 930 and a second through-hole 935 that may be proximate first endpoint 910.

Cable guide 705 may be curved about a central point 915. The curvature of cable guide 705 may be such that a radius of curvature of cable guide 705 continuously decreases from first endpoint 905 towards second endpoint 910. For example, a first radius 920 as measured from central point 915 to first endpoint 905 may be X and a second radius 925 as measured from central point 915 to second endpoint 910 may be Y, where X is greater than Y.

As shown in FIG. 9B when cable guide 705 is in a second state, second endpoint 910 may have translated and be proximate first endpoint 905. During a transition from the first state to the second state, the radius of curvature may change. For example, during the transition, first radius 920 may remain constant and second radius 925 may increase to be approximately equal to first radius 920. In other words, when cable guide 702 is in the second state, the radius of curvature may be constant.

The surface of cable guide 705 may also form a groove or other indentation that may at least partially receive a cable. For example, cable guide 705 may include a first groove 940 and a second groove 945 that may receive first cable 805 and second cable 810.

FIGS. 10A and 10B show a cable guide 1000 consistent with embodiments disclosed herein. FIG. 10A shows a top view of cable guide 1000 and FIG. 10B shows a side view of cable guide 1000 in an expanded state (e.g., a second state). Cable guide 1000 may be made of a polymer, metal, ceramic, or other composite materials. Cable guide 1000 may include a first hole 1005 and a second hole 1010 that may be used to secure cable guide 1000 to housing 110. Cable guide 1000 may have a first endpoint 1015 and a second endpoint 1020.

Cable guide 1000 may be constructed of a first section 1025. First section 1025 may be mounted to housing 110 via first hole 1005 and second hole 1010. A second section 1030 may be connected to first section 1025 via a flexible portion 1035. First flexible portion 1035 may be a hinge or a flexible material such as a low density polymer.

A pivot section 1040 may be connected to second section 1030 via a second flexible portion 1045. Second flexible portion 1045 may be a hinge or a flexible material. Pivot section 1040 may include a first pivot point 1050. First pivot point 1050 may allow a third section 1055 to pivot about second section 1030. Third section 1055 may be connected to first pivot section 1040 via a third flexible portion 1060. A fourth section 1065, a fifth section 1070, and a sixth section 1075 may be connected to third section 1055 in a similar manner.

As shown in FIG. 10B, the various flexible portions may allow cable guide 1000 to expand from a plane 1080 as indicated by arrow 1085. Cable guide 1000 may include at least one groove, not shown, that may receive at least a portion of a cable. Cable guide 1000 may also include notches sized to receive cable ties.

While FIGS. 10A and 10B show cable guide 1000 having straight portions, cable guide 1000 may also have a radius of curvature as indicated by line 1090. As such, cable guide 1000 may be curved about a central point 1095. The curvature of cable guide 1000 may be such that the radius of curvature of cable guide 1000 continuously decreases from first endpoint 1015 towards second endpoint 1020.

During a transition from a first state to a second state, the radius of curvature may change. For example, during the transition, a first radius $R_1$ may remain constant and a second radius $R_2$ may increase to be approximately equal to the first radius $R_1$. In other words, when cable guide 1000 is in the second state, the radius of curvature may be constant.

Figure 11:
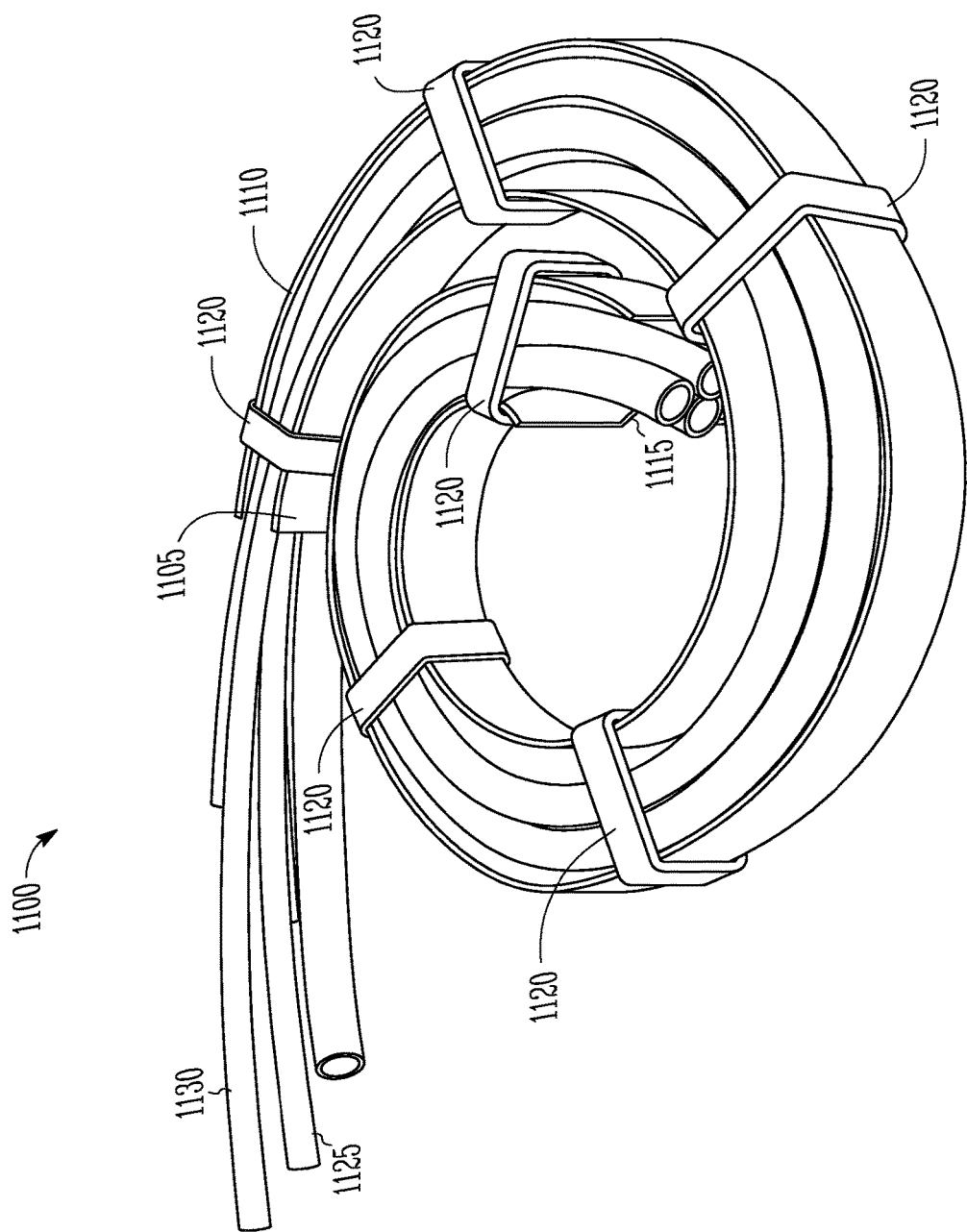
FIG. 11 shows a perspective view of a cable guide consistent with embodiments disclosed herein.

FIG. 11 shows a cable guide 1100. Cable guide 1100 may be constructed of a flexible material and may curve about a central point. Cable guide 1100 may include a first sidewall 1105 and a second sidewall 1110 projected from a bottom 1115. Cable guide 1100 may include brackets or straps 1120 that may connect to first sidewall 1105 and second sidewall 1110. Straps 1120 may secure a first cable 1125 and a second cable 1130 into cable guide 1100.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A cable guide comprising a flexible member having a first endpoint and a second endpoint, the flexible member curved about a central point, wherein when in a first state the flexible member has a radius of curvature that continuously decreases towards the second endpoint, the flexible member having a flat portion extending from the first endpoint to the second endpoint, the flat portion for attaching a cable thereto, wherein the flexible member comprises a surface that defines a plurality of notches, each of the plurality of notches sized to receive a cable tie.

2. The cable guide of claim 1,
   wherein when in the first state the first endpoint and the second endpoint are coplanar and the flat portion of the flexible member is coplanar with the first endpoint and the second endpoint, and
   wherein when in a second state, the first endpoint and the second endpoint are non-coplanar.

3. The cable guide of claim 1, wherein the flexible member comprises a surface that defines at least one groove sized to at least partially receive a cable.

4. The cable guide of claim 1, wherein when in a second state, the radius of curvature is constant.

5. The cable guide of claim 1, wherein when in a second state, the flexible member forms a helix.

6. The cable guide of claim 1, wherein the flexible member is made of a low density polymer.

7. The cable guide of claim 1, wherein the flexible member is made of a metal.

8. The cable guide of claim 1, wherein the flexible member comprises a surface that defines a through-hole proximate the first endpoint.

9. The cable guide of claim 1, wherein during a transition from the first state to a second state causes the radius of curvature to increase.

10. The cable guide of claim 1, wherein a first portion of the plurality of notches are located along an outer edge of the flexible member.

11. The cable guide of claim 1, wherein a first portion of the plurality of notches are located along an inner edge of the flexible member.

12. , the cable guide of claim 1, further comprising a plurality of cable ties, wherein each of the plurality of cable ties encircles the flexible member at a corresponding notch of the plurality of notches.

* * * * *